United States Patent
Bauer et al.

(10) Patent No.: US 9,618,150 B2
(45) Date of Patent: Apr. 11, 2017

(54) DEVICE FOR GENERATING FLUID PULSES

(71) Applicant: Airbus Operations GmbH, Hamburg (DE)

(72) Inventors: Matthias Bauer, Berlin (DE); Jakob Lohse, Berlin (DE); Wolfgang Nitsche, Gollenberg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 300 days.

(21) Appl. No.: 13/934,539

(22) Filed: Jul. 3, 2013

(65) Prior Publication Data

US 2014/0007959 A1    Jan. 9, 2014

(30) Foreign Application Priority Data

Jul. 6, 2012    (DE) .......................... 10 2012 013 328

(51) Int. Cl.
    *F16L 41/00*    (2006.01)
    *F15D 1/00*     (2006.01)

(52) U.S. Cl.
    CPC .............. *F16L 41/00* (2013.01); *F15D 1/008* (2013.01); *B64C 2230/18* (2013.01); *Y02T 50/166* (2013.01); *Y10T 137/85938* (2015.04)

(58) Field of Classification Search
    CPC .. F16L 41/00; F15D 1/008; Y10T 137/85938; Y02T 50/166; B64C 2230/18
    USPC .......................................... 137/834, 835, 838
    See application file for complete search history.

(56) References Cited

U.S. PATENT DOCUMENTS

| | | | | |
|---|---|---|---|---|
| 3,159,168 A | * | 12/1964 | Reader | F15C 1/08 137/835 |
| 3,425,430 A | * | 2/1969 | Horton | F15C 1/14 137/806 |
| 3,430,895 A | | 3/1969 | Campagnuolo | |
| 3,442,280 A | * | 5/1969 | Boothe | F15C 1/06 137/833 |
| 3,504,691 A | | 4/1970 | Campagnuolo et al. | |
| 3,528,442 A | | 9/1970 | Campagnuolo | |

(Continued)

FOREIGN PATENT DOCUMENTS

CN    102483080 A    5/2012
DE       1600577 A1    2/1971

(Continued)

OTHER PUBLICATIONS

German Patent Office, Office Action for German Patent Application No. 10 2012 013 328.6, mailed Sep. 25, 2012.

(Continued)

*Primary Examiner* — Craig Schneider
*Assistant Examiner* — Nicole Wentlandt
(74) *Attorney, Agent, or Firm* — Lorenz & Kopf, LLP

(57) ABSTRACT

A method for generating fluid pulses is provided. The device comprises a first channel with a first fluid inlet and a second channel with a second fluid inlet, in which the first fluid inlet and second fluid inlet are substantially situated opposite each other. The first channel comprises a first control outlet at the height of the first fluid inlet, and the second channel comprises a second control outlet at the height of the second fluid inlet, in which the respective control outlet is located in front of the respective fluid inlet in relation to the inflowing direction of the fluid inlet.

15 Claims, 3 Drawing Sheets

(56) References Cited

U.S. PATENT DOCUMENTS

| | | | |
|---|---|---|---|
| 4,227,550 | A | 10/1980 | Bauer et al. |
| 5,938,404 | A | 8/1999 | Domzalski et al. |
| 6,390,116 | B1 | 5/2002 | Kim et al. |
| 7,128,082 | B1 | 10/2006 | Cerretelli et al. |
| 2006/0048829 | A1 | 3/2006 | Seifert et al. |
| 2012/0001028 | A1 | 1/2012 | Frey et al. |

FOREIGN PATENT DOCUMENTS

| | | |
|---|---|---|
| DE | 1650186 A1 | 7/1971 |
| DE | 102010048123 A1 | 4/2012 |

OTHER PUBLICATIONS

German Patent Office, Office Action for German Patent Application No. 10 2010 148 123.8-14 DI, mailed Feb. 11, 2011.
International Searching Authority, International Search Report for PCT International Application No. PCT/EP2011/005087, mailed Jun. 2, 2012.
European Patent Office, Extended European Search Report for European Patent Application No. 12164009.8, mailed Dec. 6, 2012.
State Intellectual Property Office of the Peoples' Republic of China, Office Action in Chinese Patent Application No. 201310282811.0, mailed May 27, 2015.

\* cited by examiner

DEVICE FOR GENERATING FLUID PULSES

CROSS-REFERENCE TO RELATED APPLICATIONS

This application claims priority to German Patent Application No. 10 2012 013 328.6, filed Jul. 6, 2012, which is incorporated herein by reference in its entirety.

TECHNICAL FIELD

The technical field relates to a device for generating fluid pulses.

BACKGROUND

As known from avionics, wings may experience a stall under certain conditions. An active flow control may be used in an attempt to counteract such a stall. The latter uses a pulsed air stream. The pulsed air stream is generated in a fluidic actuator, for example.

Fluidic actuators represent a highly efficient flow control device, which makes it possible to generate a pulsed air stream for flow control without in the process requiring movable mechanical components in the jet diffuser (fluidic actuator). These actuators are based on the principle of enhancing the flow mechanics, wherein a large quantity of air is diverted by a distinctly smaller quantity of control air. This control air must alternately be supplied to the control terminals of the fluid actuator.

There is a distinction between externally controlled fluid actuators and self-induced fluid actuators. In eternally controlled actuators, an external control air supply is used, which is typically actively controlled by way of valves, e.g., solenoid valves. In self-induced actuators, control fluid is removed from and returned to the respective output lines via a respective structurally separate return channel. Given a suitable dimensioning, this makes it possible to generate a self-induced vibration, a so-called fluidic oscillation.

As a general rule, a self-induced fluidic actuator of the aforementioned type comprises a supply line, two outputs, an interaction chamber as well as two so-called feedback loops, which are structurally separated from the rest of the interaction chamber, as well as from the supply lines. The compressed air-supplied air stream from the supply line is present at a lateral wall of the supply chamber, so that the air stream exits from the first output. At the same time, a portion of the air stream penetrates into the input of the allocated first feedback loop (coupling), and after a time delay again exits at the output of the allocated first feedback loop. The output is located near the input of the supply line, and may hence be used to control the air stream. As it exits, the portion of the air stream coupled in the first feedback loop forces the air stream in the direction of the second output. The process then repeats itself in a quasi mirror inverted fashion on the other side. As a consequence, the fluidic actuator alternately provides a pulsed air stream at both outputs. Since there are no mechanical parts, the fluidic actuator is highly efficient in this form.

A self-induced fluidic actuator of the aforementioned type is known from U.S. Pat. No. 4,227,550. This self-induced fluidic actuator comprises feedback loops and outlet lines.

One major problem relative to self-induced fluidic actuators during active flow control (AFC—active fluid control) has to do with balancing the individual components. A distinction can be made between flow control by the fluid actuator and the control stage of the fluid actuator. The return line (feedback loop) routes a portion of the fluid flowing through from the output of the actuator back to the interaction zone, and there causes the actuator to switch over. The outlet line (output control fluid) feeds a pulsed fluid stream to a recipient (e.g., a control port of the active fluid control fluid actuator stage), wherein the signal of the outlet lines is phase-shifted by 180° degrees relative to each other. On the one hand, the restricting effect exerted by flow control on the control stage is of significant importance. If the restricting effect is too high, signal modulation drops until a constant air stream finally exits the outputs, as a result of which the control signal present at the AFC stage is no longer sufficient. On the other hand, the required installation space for the control stage is high, since the latter depends on the length of the return lines (feedback loops) and the feed lines separate from the latter to the control ports of the downstream stage (output control fluid). The required installation space indirectly gives rise to additional problems. One such problem is that the installation space required with only a limited installation space being available, such as in the case of a wing, may only be realized by a highly complex structural design; on the other hand, this also yields an elevated demand for material, which manifests itself in a weight proportion that must not be underestimated.

Other objects, desirable features and characteristics will become apparent from the subsequent summary and detailed description, and the appended claims, taken in conjunction with the accompanying drawings and this background.

SUMMARY

According to various embodiments, the present disclosure provides a device for generating fluid pulses that is less critical in terms of dimensioning and/or requires less installation space than conventional devices.

As a solution, the present disclosure proposes a novel device for generating fluid pulses. The device comprises a first channel with a first fluid inlet and a second channel with a second fluid inlet, wherein the first fluid inlet and second fluid inlet are essentially situated opposite each other. The first channel comprises a first control outlet at the height of the first fluid inlet, and the second channel comprises a second control outlet at the height of the second fluid inlet, wherein the respective control outlet is located in front of the respective fluid inlet in relation to the inflowing direction of the fluid inlet. During operation, a fluid flowing in through the first fluid inlet passes through the first channel, and after running through the first channel, at least a portion of the introduced fluid exits the first channel through the first control outlet, thereby causing the inflowing fluid to be diverted toward the second fluid inlet, or a fluid flowing in through the second fluid inlet passes through the second channel, and after running through the second channel, at least a portion of the introduced fluid exits the second channel through the second control outlet, thereby causing the inflowing fluid to be diverted toward the first fluid inlet. The first channel comprises a working outlet or several working outlets, through which a portion of the inflowing fluid is removable. In the fluid direction subsequent to the last working outlet of the first channel, the remaining portion of the introduced fluid exits the first channel through the first control outlet. Depending on how the second channel is configured, i.e., on whether the second channel comprises no working outlet, one working outlet or several working outlets, either the entire introduced fluid, or at least the remaining portion of the introduced fluid in the fluid direction subsequent to the last working channel of the second channel, exits the second channel through the second control outlet.

As a result, the present disclosure provides a device for generating fluid pulses that is less critical in terms of dimensioning and/or requires less installation space than conventional devices. This stems in particular from the fact that just a single line per channel must now be dimensioned, and a working line and feedback line need not be dimensioned, as had been the case in prior art.

In one of various embodiments of the present disclosure, the cross sectional surface of the first channel is abruptly reduced subsequent to a working outlet. This produces a bottleneck effect.

In one embodiment of the present disclosure, the first channel again expands subsequent to the abrupt reduction. This counteracts a thickening of the boundary layer at the channel edge, for example ensuring a favorable flow toward a subsequent working outlet.

In another embodiment of the present disclosure, the fluid flows into the first channel or the second channel essentially from a rectangular access channel. Rectangular channels may be beneficial from the standpoint of flow mechanics.

In yet another exemplary embodiment of the present disclosure, at least one working outlet branches away from the first channel at an angle to the primary channel direction or essentially perpendicular to the primary channel direction, wherein the primary channel direction is not necessarily a straight line. This makes it possible to achieve very compact structural designs, since the entire device does not have to lie in one plane.

In one embodiment of the present disclosure, the first channel comprises at least two working outlets, wherein the working outlets comprise different cross sectional surfaces. By providing different cross sectional surfaces, the removed quantity of fluid may be optimally adjusted to the subsequent intended purpose.

In yet another exemplary embodiment of the present disclosure, the second channel is structured symmetrically to the first channel. As a result, alternating fluid pulses may be provided to the working outlets of the first and second channel.

In one of various embodiments, the second channel is structured asymmetrically relative to the first channel. This construction makes it possible to provide "duty cycles," for example. In this example, asymmetrically as used herein may refer to a differently configured length of the channels on the one hand, or additionally or alternatively denote a differing number of working outlets of the respective channels. For example, one channel may comprise a plurality of working outlets, while another channel may comprise just one or even no working outlet.

In another exemplary embodiment of the present disclosure, the cross sectional surface of the second channel differs from the cross sectional surface of the first channel and/or the first channel and second channel comprise a different capacity in terms of flow mechanics. The duration of the fluid stream may also be influenced in the two channels, for example by varying the lengths for the two channels.

In one embodiment of the present disclosure, a device according to the present teachings is used as a control stage of a fluid actuator, in particular a fluid actuator for influencing a flow along a flow surface.

In another embodiment of the present disclosure, a device according to the present teachings directly influences a flow along a flow surface, and acts as an independent fluid actuator, for example which provides fluid pulses.

In yet another exemplary embodiment of the present disclosure, the device provides a pulsed liquid jet. This is especially advantageous for applications in medical technology, but also in materials processing.

In one embodiment of the present disclosure, the device provides a pulsed fluid stream comprising a fuel or a fuel-air mixture for subsequently burning the pulsed fluid stream. This is especially advantageous for a controlled burning.

In an exemplary embodiment of the present disclosure, the device provides a pulsed fluid stream for cooling another arrangement, in particular turbine blades or combustion chamber walls.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
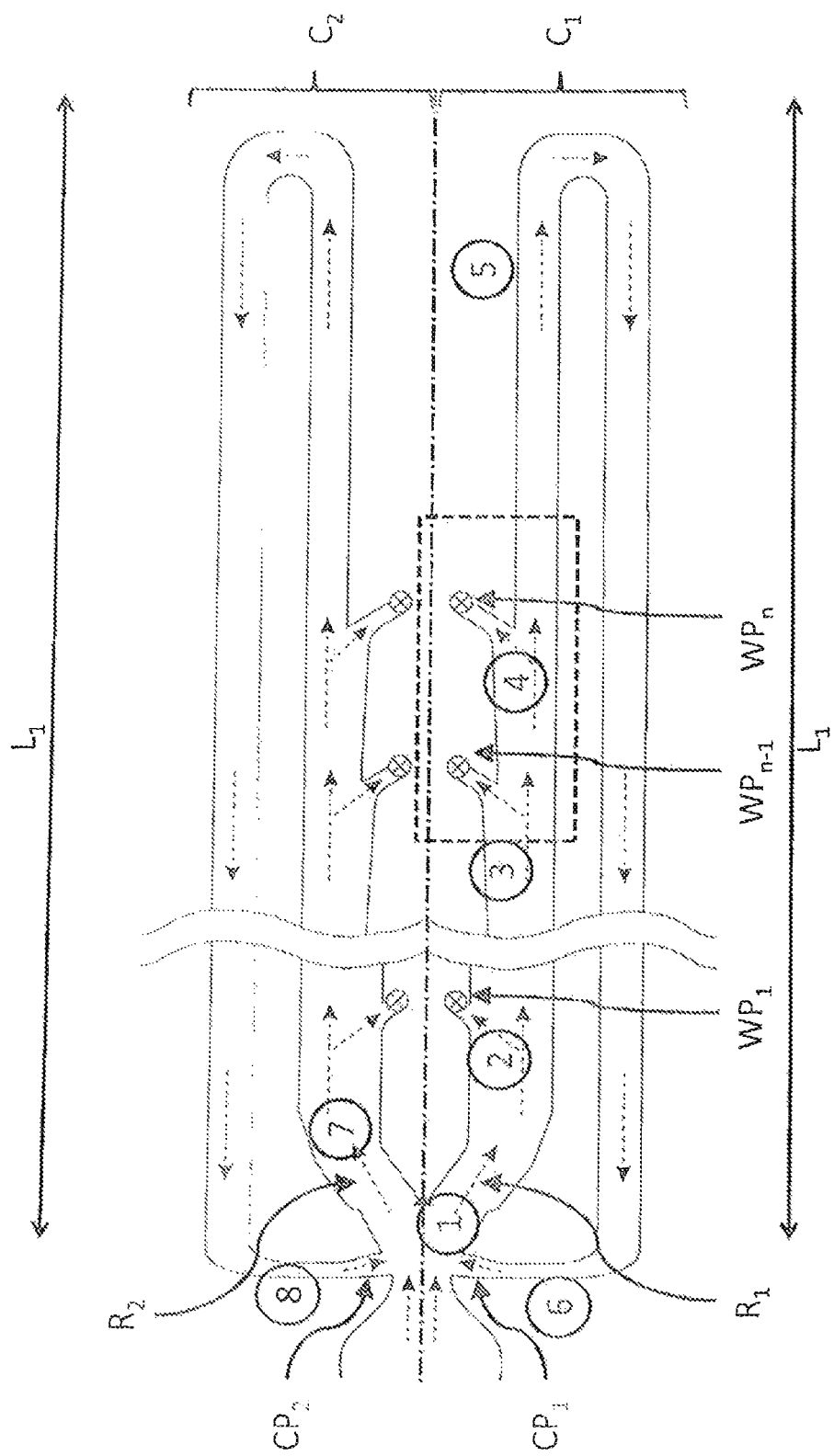
FIG. 1 is a first schematic arrangement according to an exemplary embodiment of the present disclosure.

FIG. 1 shows a first schematic arrangement according to one of various exemplary embodiments of the present disclosure.

A device for generating fluid pulses comprises a first channel $C_1$ with a first fluid inlet $R_1$ and a second channel $C_2$ with a second fluid inlet $R_2$. The first fluid inlet and second fluid inlet are substantially situated opposite each other. The first channel $C_1$ has a first control outlet $CP_1$ at the height of the first fluid inlet $R_1$, and the second channel $C_2$ has a second control outlet $CP_2$ at the height of the second fluid inlet $R_2$, wherein the respective control outlet $CP_1$, $CP_2$ is located in front of the respective fluid inlet in relation to the inflowing direction of the fluid inlet. During operation, a fluid flowing in through the first fluid inlet $R_1$ passes through the first channel $C_1$, and after running through the first channel $C_1$, at least a portion of the introduced fluid exits the first channel $C_1$ through the first control outlet $CP_1$, thereby causing the inflowing fluid to be diverted toward the second fluid inlet $R_2$, or a fluid flowing in through the second fluid inlet $R_2$ passes through the second channel $C_2$, and after running through the second channel $C_2$, at least a portion of the introduced fluid exits the second channel $C_2$ through the second control outlet $CP_2$, thereby causing the inflowing fluid to be diverted toward the first fluid inlet $R_1$. The first channel $C_1$ has a working outlet $WP_1$ or several working outlets $WP_1$, $WP_2$, ..., $WP_{n-1}$, $WP_n$, through which a portion of the inflowing fluid may be removed. The number of working outlets is assumed to be n on FIG. 1, wherein n stands for a natural number. Subsequent to the last working outlet of the first channel $C_1$, the remaining portion of the introduced fluid exits the first channel $C_1$ through the first control outlet $CP_1$. In other words, the fluid does not escape, but is rather completely available for control purposes or passage through the second channel.

Without delving into the above any further for now, the second channel $C_2$ may have the same shape as channel $C_1$, or channel $C_2$ may have a design differing from channel $C_1$. For example, channel $C_2$ may have a differently configured length $L_1$, $L_2$ and/or cross sections for the channels, and a varying number of working outlets may additionally or alternatively be involved. For example, channel $C_1$ may comprise a plurality of working outlets, while channel $C_2$ has only one or even no working outlets.

Figure 3:
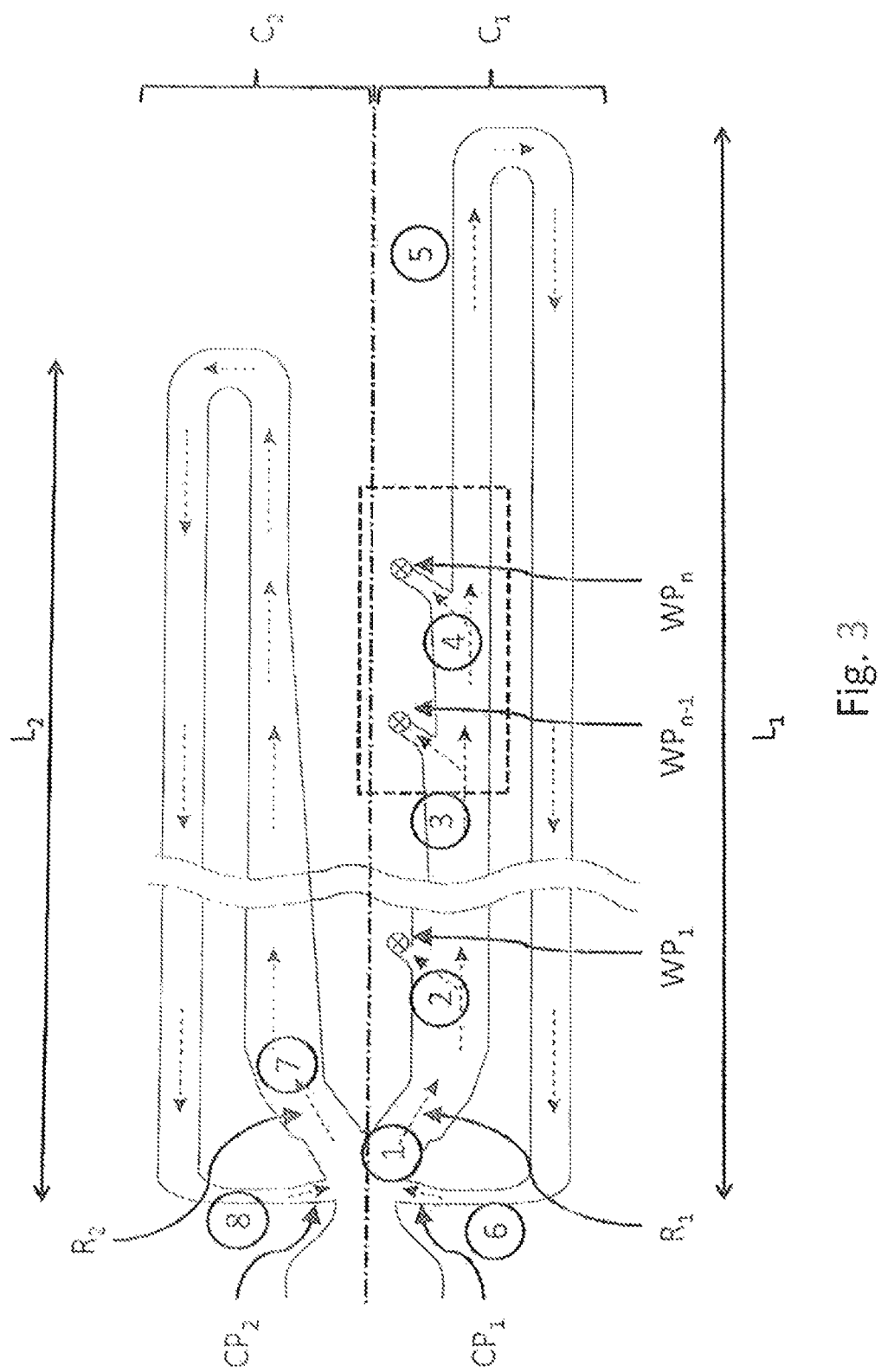
FIG. 3 is a second schematic arrangement according to another exemplary embodiment of the present disclosure.

The sequence will be briefly outlined below, wherein individual locations on FIGS. 1 and 3 are numbered in chronological sequence, and circled in the drawings for delineation from device features.

When a fluid flows in during operation, the fluid stream gravitates toward one of the two sides for reasons of no greater interest, and consequently flows into one of the fluid inlets. This is the case at fluid inlet $R_1$ on FIG. 1, and the location is correspondingly marked 1. Subsequent thereto, the fluid stream passes location 2. Situated at location 2 is an exemplary first working outlet $WP_1$, from which a certain portion of fluid is now removed. As depicted at locations 3 and 4, one or more additional optional working outlets $WP_{+1}$ and $WP_n$ may then follow. A respective portion of fluid may be removed at these additional optional working outlets as before. Arranging various working outlets spatially close to each other may ensure that fluid exits the respective working outlet in a nearly synchronous manner, i.e., that only a slight phase shift arises. The still present fluid then continues flowing through the remainder of the channel (location 5) and is routed to the control outlet $CP_1$. In other words, the fluid does not escape, but rather is completely available for control purposes or passage through the second channel, depending on the degree of modulation. Given a 100% degree of modulation, i.e., the inflowing fluid is completely diverted into the second fluid inlet $R_2$, fluid no longer enters into the first fluid inlet $R_1$ previously receiving the inflow. By contrast, given less than a 100% degree of modulation, at least a small portion of the inflowing fluid continues to flow into the previous first fluid inlet $R_1$. The still present fluid exits channel $C_1$ at location 6, and now diverts the fluid still flowing toward fluid inlet $R_1$ to fluid inlet $R_2$ of channel $C_2$ (location 7). The fluid then passes through channel $C_2$, and at least a portion of the fluid is routed toward the control outlet $CP_2$. It also holds true here that all fluid remaining after removal through a possibly present working outlet or several possibly present working outlets of the second channel $C_2$ is available for control purposes in the same way as described for channel $C_1$. At location 8, the still present fluid exits channel $C_2$, and now diverts the fluid still flowing toward fluid inlet $R_2$ back to fluid inlet $R_1$ of channel $C_1$ (location 1). This concludes the cycle, which then begins anew. The length of the line between the last working outlet and ensuing control outlet is critically important in determining the switching frequency of the actuator.

The first control outlet $CP_1$ is generally arranged in such a way that a fluid flowing out of the first control outlet $CP_1$ substantially flows into the second fluid inlet $R_2$ (location 6), and that the second control outlet $CP_2$ is arranged in such a way that a fluid flowing out of the second control outlet $CP_2$ substantially flows into the first fluid inlet $R_1$ (location 8). This increases efficiency, and also enables reliable switching even given a high restrictive effect.

Figure 2:
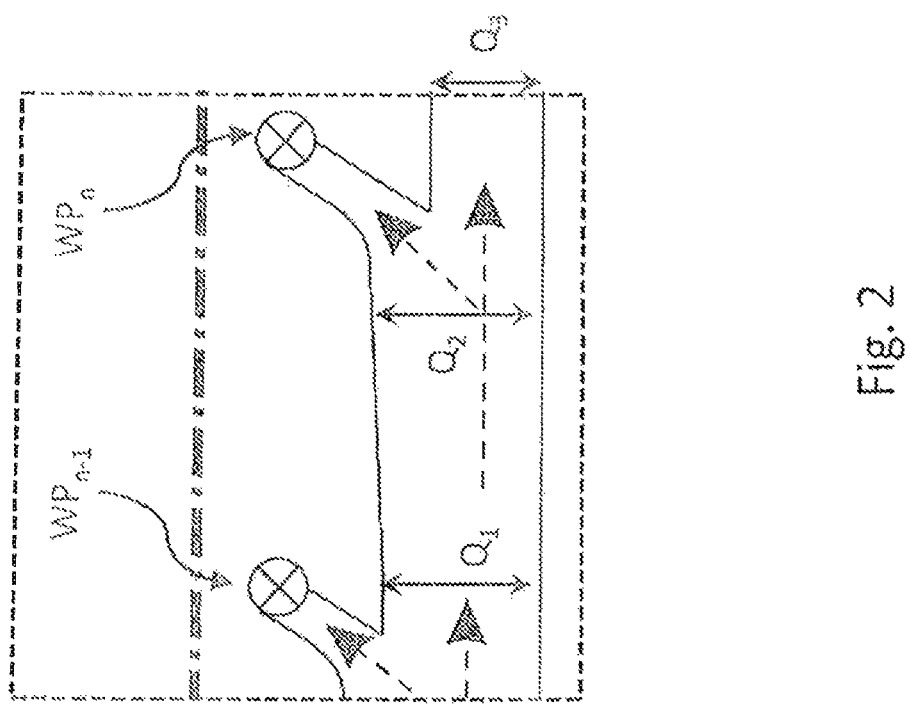
FIG. 2 is a schematically represented detail of various embodiments of the present disclosure.

FIG. 2 depicts a schematically represented detail of various embodiments of the present disclosure. This detail corresponds to the frame denoted with dashed lines on FIGS. 1 and 3.

As depicted, the cross sectional surface of the first channel $C_1$ is abruptly reduced subsequent to a working outlet $WP_{n+1}$, $W_{Pn}$. For example, the cross section $Q_2$ is smaller before the working outlet $WP_n$ than the cross section $Q_3$ after the working outlet $WP_n$. Due to the abrupt reduction, the resultant damming effect in the feed lines to the fluid outputs may make fluid with an overall pressure exceeding the reference pressure of the environment available to a downstream recipient. As further shown on FIG. 2, the first channel $C_1$ again expands subsequent to the abrupt reduction. For example, the cross section $Q_2$ before the working outlet $WP_n$ is larger than the cross section $Q_1$ after the working outlet $WP_{n+1}$. The expansion counteracts the thickening of the boundary layers. In addition, this contouring makes it possible to favorably route the fluid to the working outlets in terms of flow mechanics, and enables an extremely homogeneous distribution of the fluid to be removed among a plurality of outlet openings.

In one of various embodiments of the present disclosure, the fluid flows into the first channel or the second channel substantially from a rectangular access channel. Rectangular cross sections and in particular quadratic cross sections are beneficial from the standpoint of flow mechanics.

In another exemplary embodiment of the present disclosure, at least one working outlet branches away from the first channel at an angle to the primary channel direction or substantially perpendicular to the primary channel direction. For example, the working outlet or the working outlets, as denoted by crosses in the working outlets on FIGS. 1 and 3, may branch off perpendicular to the channel plane, i.e., normal to the drawing plane. This enables a very compact design that economizes on material. It is also possible to provide the channel $C_1$, $C_2$ itself with a curvature, i.e., the primary channel direction is not necessarily a straight line. This may be targeted at further reducing the installation size, or permit use in systems that were not straight from the very outset, e.g., for cooling turbine blades or combustion chambers.

In one of various embodiments of the present disclosure, at least one working outlet branches away from the first channel at an angle to the primary channel direction or substantially perpendicular to the primary channel direction. For example, the working outlet or the working outlets, as denoted by crosses in the working outlets on FIGS. 1 and 3, may branch off perpendicular to the channel plane, i.e., normal to the drawing plane. This enables a very compact design that economizes on material. It is also possible to provide the channel $C_1$, $C_2$ itself with a curvature, i.e., the primary channel direction is not necessarily a straight line. This may be targeted at further reducing the installation size, or permit use in systems that were not straight from the very outset, e.g., for cooling turbine blades or combustion chambers.

The present disclosure further provides that the working outlets comprise differing cross sectional surfaces. This makes it possible to optimally adjust the removal of fluid at different working outlets to the respective intended purpose.

As depicted on FIG. 1, the second channel $C_2$ may be structured symmetrically to the first channel $C_1$. In other words, channel $C_2$ substantially has the same configuration as channel $C_1$, i.e., the same length $L_1$ and same number and positioning of working outlets, as well as a similar type of dimensioning for the cross sections.

As an alternative hereto, the second channel $C_2$ may also be structured asymmetrically to the first channel $C_1$, as depicted on FIG. 3. For example, the cross sectional surface of the second channel $C_2$ may differ from the cross sectional surface of the first channel $C_1$, and/or the first channel $C_1$ and second channel $C_2$ comprise a varying capacity in terms of flow mechanics for other reasons. Furthermore, as shown on FIG. 3, the time it takes to pass through the first channel $C_1$ may differ from the time it takes to pass through the second channel $C_2$ given an identical fluid supply. For example, channel $C_2$ has a distinctly shorter length $L_2$ than channel $C_1$ with a length $L_1$. As a result, for example, a "duty cycle" may easily be provided. The work duration of the "duty cycle" is determined by flow mechanics-related characteristics of channel $C_1$, while the idle duration of the "duty cycle" is determined by the flow mechanics-related characteristics of channel $C_2$.

The characteristics of the device according to the present disclosure make it especially suitable as a control stage of a fluid actuator, in particular a fluid actuator for influencing a flow along a flow surface. Critically important with regard to the latter are the stability even at a higher restrictive effect along with the enablement of small installation sizes and the rise in available weight associated therewith.

Since the device according to the present disclosure may itself provide a pulsed fluid stream, the device is able to directly influence a flow along a flow surface.

However, the present disclosure is not limited to these areas of application. Fluid pulses, in particular pulsed liquids, are also required in other areas. A first example involves the combustion of hydrocarbons for power or thermal purposes. A fuel or fuel-air mixture is frequently added to a combustion nozzle to ensure a good combustion, and thereby keep harmful gas emission low and efficiency high. The injected fluid is then burned via external or self ignition. Multiple injections are here used in addition to the multiple external ignitions. An adjustable self-induced vibration and/or provision of a duty cycle represent a possible embodiment for these systems as well.

Another example involves the processing of metal materials. For example, the objective may be a roughening of the surface or separation.

Another example has to do with medical technology. For example, pulsed liquid jets may be used as an alternative to lasers. This is especially advantageous, since as opposed to a laser, a pulsed water jet does not require that tissue be vaporized, but rather allows it to be separated out and transported away by the fluid jet itself. This decreases damage to surrounding tissue.

The devices according to the present disclosure are suitable as independent systems for generating fluid impulses, and by comparison to prior art make it possible to provide a plurality of removal sites for pulsed fluid, substantially without any mutual phase shifting, which then may be released directly to the environment, e.g., via actuator chambers, or be used for flow control purposes. Furthermore, the present disclosure enables the provision of different amplitudes at the most varied of removal sites using a single fluidic switch and supply pressure. In addition, the present disclosure permits a "duty cycle" variation, wherein it must be noted that the fluid is not simply uselessly released to the environment in these "duty cycles", but instead remains inside the device and is available in the next "duty cycle".

The present disclosure further permits a design in which up to and including rotationally symmetrical components may be integrated even along curved surfaces, e.g., turbine blades, combustion chamber diffusers, etc. As opposed to known actuators, the feedback loops are not present as an independent line, but instead the feedback loops are functionally integrated into the respective outlet line. Integrating the feedback loops into the outlet line makes it possible to achieve a distinct reduction in the required installation space. In comparison to previous systems, this reduction measures roughly about 50 percent. This yields additional advantages, since the devices according to the present teachings are tangibly less complex as a result, and a lower weight may also be realized due to the lower demand for material. Furthermore, this present disclosure also makes it possible to achieve outlet signal stability and increased efficiency.

Let it be noted that neither moving nor electrical components are required for this purpose, thus making the present disclosure impervious to electrical or mechanical disruptions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for generating fluid pulses, comprising:
a first channel with a first fluid inlet, a first working outlet, a second working outlet, and a first control outlet, the first control outlet located in front of the first fluid inlet in relation to an inflowing direction of fluid to the first fluid inlet, the first channel including at least one working outlet through which a portion of the inflowing fluid is removable; and
a second channel with a second fluid inlet and a second control outlet, the second fluid inlet substantially situated opposite the first fluid inlet and the second control outlet located in front of the second fluid inlet in relation to an inflowing direction of fluid to the second fluid inlet,
wherein, during operation, a fluid flowing in through the first fluid inlet passes through the first channel, and after running through the first channel, at least a portion of the introduced fluid exits the first channel through the first control outlet, thereby causing the inflowing fluid to be diverted toward the second fluid inlet, and a fluid flowing in through the second fluid inlet passes through the second channel, and after running through the second channel, at least a portion of the introduced fluid exits the second channel through the second control outlet, thereby causing the inflowing fluid to be diverted toward the first fluid inlet,
wherein, in the fluid direction subsequent to the last working outlet of the first channel, the remaining portion of the introduced fluid exits the first channel through the first control outlet,
wherein the cross sectional surface of the first channel is abruptly reduced between the first working outlet and the second working outlet and subsequent to the first working outlet, and wherein the first channel expands subsequent to the abrupt reduction and ahead of the second working outlet between the abrupt reduction and the second working outlet.

2. The device according to claim 1, wherein the first and second working outlets branch away from the first channel at an angle to a primary channel direction or substantially perpendicular to the primary channel direction.

3. The device according to claim 1, wherein the first and second working outlets comprise different cross sectional surfaces.

4. The device according to claim 1, wherein the second channel is structured symmetrically to the first channel.

5. The device according to claim 1, wherein the second channel is structured asymmetrically relative to the first channel.

6. The device according to claim 5, wherein the cross sectional surface of the second channel differs from the cross sectional surface of the first channel.

7. The device according to claim 5, wherein the time it takes to pass through the first channel differs from the time it takes to pass through the second channel given an identical fluid supply.

8. The device according to claim 1, wherein the device is a control stage of a fluid actuator for influencing a fluid flow along a flow surface.

9. The device according to claim 1, wherein the device directly influences a fluid flow along a flow surface.

10. The device according to claim 1, wherein the device provides a pulsed liquid jet.

11. The device according to claim 1, wherein the device provides a pulsed fluid stream comprising a fuel or a fuel-air mixture for subsequently burning the pulsed fluid stream.

12. The device according to claim 1, wherein the device provides a pulsed fluid stream for cooling turbine blades or combustion chamber walls.

13. The device according to claim 1, wherein the first channel and the second channel comprise a different capacity for fluid flow.

14. The device according to claim 2, wherein the primary channel direction is not a straight line.

15. A device for generating fluid pulses, comprising:

a first channel with a first fluid inlet and a first control outlet, the first control outlet located in front of the first fluid inlet in relation to an inflowing, direction of fluid to the first fluid inlet, the first channel including at least one working outlet through which a portion of the inflowing fluid is removable; and a second channel with a second fluid inlet and a second control outlet, the second fluid inlet substantially situated opposite the first fluid inlet and the second control outlet located in front of the second fluid inlet in relation to an inflowing direction of fluid to the second fluid inlet, wherein, during operation, a fluid flowing in through the first fluid inlet passes through the first channel, and after running through the first channel, at least a portion of the introduced fluid exits the first channel through the first control outlet, thereby causing the inflowing fluid to be diverted toward the second fluid inlet, and a fluid flowing in through the second fluid inlet passes through the second channel, and after running through the second channel, at least a portion of the introduced fluid exits the second channel through the second control outlet, thereby causing the inflowing fluid to be diverted toward the first fluid inlet, wherein, in the fluid direction subsequent to the last working outlet of the first channel, the remaining portion of the introduced fluid exits the first channel through the first control outlet, and wherein the at least one working outlet further comprises at least two working outlets, wherein each of the at least two working outlets comprise different cross sectional surfaces.

* * * * *